Dec. 24, 1935.   E. LUCHSINGER   2,025,468
VEHICLE DRIVEN BY INTERNAL COMBUSTION ENGINES
THROUGH ELECTRIC TRANSMISSION APPARATUS
Filed April 19, 1932

INVENTOR:
Emil Luchsinger
BY
Pennie Davis Marvin & Edmonds
ATTORNEY.

UNITED STATES PATENT OFFICE 2,025,468

VEHICLE DRIVEN BY INTERNAL COMBUSTION ENGINES THROUGH ELECTRIC TRANSMISSION APPARATUS

Emil Luchsinger, Winterthur, Switzerland, assignor to the firm of Sulzer Freres Societe Anonyme, Winterthur, Switzerland Application April 19, 1932, Serial No. 606,113
In Switzerland April 23, 1931

3 Claims. (Cl. 98—4)

This invention relates to vehicles, and more particularly to rail vehicles of the kind driven by one or more combustion engines through an electric transmission apparatus.

In vehicles of this kind the lubricating oil vapor given off by the internal combustion engines tends to do considerable damage to certain parts of the electrical apparatus. The windings of the generators, particularly, are apt to be exposed to such detrimental influences and cause, when damaged, troubles such as interruptions of current and even short circuits. Sparks at the brushes of the generator when they occur in an atmosphere of air mixed with lubricating oil vapors bring about the danger of an ignition of the lubricating oil vapors and a fire which may result in loss of life and destruction of the vehicle.

It is the principal object of the present invention to substantially reduce the danger in driving a vehicle by internal combustion engines through electric transmission apparatus, and to thus insure the safety of all persons dependent upon safe operation of the vehicle.

A further object of this invention is the considerable reduction in the cost of control and repair work for such a vehicle.

A still further object of this invention is to lengthen the period of usefulness of the electric apparatus used with the internal combustion engine in the operation of the vehicle.

In a vehicle according to the invention, the internal combustion engine installation is separated from the electrical apparatus, and the air supply to that part of the vehicle containing the internal combustion engine installation is taken from that part in which the electrical apparatus is arranged. Preferably, the internal combustion engine installation and the electrical apparatus are arranged in separate compartments, the air supply to the compartment containing the internal combustion engine installation being taken from the compartment containing the electrical apparatus.

Figure 1:
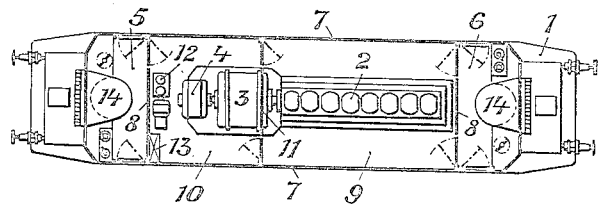
Figure 2:
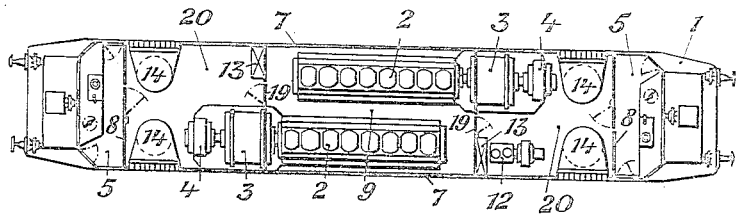

Two constructions of a rail vehicle according to the invention are illustrated diagrammatically and by way of example in Figs. 1 and 2 respectively of the accompanying drawing.

In the construction illustrated in Fig. 1, the rail vehicle 1 is furnished with an internal combustion engine 2 which drives an electric generator 3 and an exciter 4, the generator 3 furnishes the power necessary to operate the driving motors (not shown) of the vehicle 1. A cabin 5 for the driver is located at that end of the vehicle which is normally the front and a second cabin 6 is located at the opposite end of the vehicle for the same purpose. The vehicle is provided with outer walls 7, a roof (not shown) and transverse internal walls or partitions 8 which separate the cabins 5 and 6 from the electrical apparatus and the internal combustion engine respectively.

A partition 11 divides the main part of the vehicle into two compartments 9 and 10 which respectively contain the internal combustion engine 2 and the electric generator set 3, 4. The front cabin 5 is thus separated from the engine compartment 9 by the compartment 10 for the electric generator set. A pump or compressor 12 for the brake system and the electric apparatus 13 are located in the compartment 10 and coolers 14 for the cooling medium may be located in the drivers' compartments 5 and 6. The internal combustion engine 2 is thus arranged in a compartment separate from that containing the electric equipment.

The air supply to the compartment 9 containing the internal combustion engine 2 is taken in a known manner from the compartment 10 in which the electric equipment is located. In this way the tendency for fumes or gas, which may be injurious to the electric equipment, to pass from the internal combustion engine to the electric machinery is reduced to a minimum.

In the construction illustrated in Fig. 2, the intermediate compartment 9 contains only the internal combustion engines 2 and compartments 20, formed by partitions 19, and the aforesaid partitions 8 are located at opposite sides of the compartment 9 and contain the electric machinery, i. e., the electric generators 3, the exciters 4, and the electric apparatus 13. Two coolers 14 for the cooling medium may also be located in each of the compartments 20. The pump or compressor 12 for the brake system may likewise be located in one of said compartments. The air for cooling the generators 3 thus first comes into contact with the generators and then passes therefrom into the intermediate compartment 9 containing the internal combustion engines. Hence, the tendency for fumes or gases to pass from the compartment 9, containing the internal combustion engine, to the electric equipment, is reduced to a minimum. In this case, as in the preceding case, the air flows from one of the chambers 20 containing the electric equipment into the chamber 9 containing the internal combustion engine.

In this form of the invention, as well as in the form previously described, the ends of the generators 3 preferably pass through the partitions 19 so that the air supply for cooling the generators may pass therefrom into the compartment 9 containing the internal combustion engine.

Since the cooling air passes from the electric equipment to the internal combustion engine installation it will be seen that the present invention provides a vehicle of the type described in which the electric equipment is cooled with substantially pure cooled air, and in addition efficient ventilation of that part of the vehicle containing the internal combustion engine or engines is insured. Furthermore, a common air outlet or ventilator may be provided for those parts of the vehicle containing the electric equipment and the engine or engines. Also, by evacuating the air from the compartment containing the internal combustion engine, a sub-atmospheric pressure will be produced in that compartment whereby the air in the compartments 20, or the compartment 10 will pass into the engine compartment 9, whereby thorough ventilation of the compartments containing the electric machinery will be obtained. The provision of a compartment between each driver's cabin and the compartment containing the internal combustion engine or engines, as shown in Fig. 2, has the advantage that the passage of fumes or gases and the transmission of noise from the machinery to the driver's cabin are reduced.

If desired, any one or more of the compartments may be formed by partitions which extend in the longitudinal direction of the vehicle, instead of by the transverse partitions as above described. Again, if desired, the coolers for the cooling medium may be located in a separate compartment at one or both ends of the vehicle, and separated from the machinery which radiates heat by at least one intermediate compartment, whereby the medium while in the coolers will not be subjected to heat produced by the machinery.

Numerous advantages are obtained with a vehicle according to the above description, a characteristic advantage being the substantial prevention of lubricating oil vapors reaching and damaging the electric equipment.

It will be understood that the embodiments of the invention above described merely serve to illustrate the invention and various changes may be made in the construction and arrangement of parts thereof without departing from the spirit of the invention.

I claim:

1. In a vehicle driven by at least one internal combustion engine through electric transmission apparatus, a compartment for the internal combustion engine installation, and a separate compartment for the electric transmission apparatus, and means for taking at least a part of the air supply for the compartment which contains the internal combustion engine installation from the compartment containing the electrical apparatus.

2. In a vehicle driven by at least one internal combustion engine through electric transmission apparatus, a compartment for the internal combustion engine installation, and a separate compartment for the electric transmission apparatus, and means for passing the air used for cooling the electrical transmission apparatus from said apparatus to that part of the vehicle which contains the internal combustion engine installation.

3. In a vehicle, an internal combustion engine, electrical transmission-apparatus including a generator, a partition separating said engine from said electrical apparatus, said partition having the rear end of the generator passing therethrough, and means for causing ventilating air to pass from the compartment which contains the electrical apparatus through said generator and said partition to said engine-compartment.

EMIL LUCHSINGER.